US011003231B2

(12) United States Patent
Adderly et al.

(10) Patent No.: US 11,003,231 B2
(45) Date of Patent: May 11, 2021

(54) SELECTIVE POWER DISTRIBUTION TO INDIVIDUAL OUTLETS

(71) Applicant: International Business Machines Corporation, Armonk, NY (US)

(72) Inventors: Darryl Adderly, Cary, NC (US); Jonathan Jackson, Cedar Grove, NC (US); Eric Libow, Raleigh, NC (US); Ajit Jariwala, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 15/839,390

(22) Filed: Dec. 12, 2017

(65) Prior Publication Data
US 2019/0179395 A1   Jun. 13, 2019

(51) Int. Cl.
*G06F 1/3203*  (2019.01)
*G05B 15/02*  (2006.01)
*G05F 1/66*   (2006.01)
*H01R 25/00*  (2006.01)
*H02J 3/14*   (2006.01)
*G06Q 10/08*  (2012.01)
*H02J 13/00*  (2006.01)

(52) U.S. Cl.
CPC ........... *G06F 1/3203* (2013.01); *G05B 15/02* (2013.01); *G05F 1/66* (2013.01); *G06Q 10/08* (2013.01); *H01R 25/00* (2013.01); *H02J 3/14* (2013.01); *H02J 13/0082* (2013.01); *H01R 25/003* (2013.01)

(58) Field of Classification Search
CPC ...... G06F 1/3203; G06F 1/266; G06F 1/3206; G06F 1/3287; G06F 1/263; G05B 15/02; G05F 1/66; H01R 25/00; H01R 25/003; H02J 3/14; H02J 13/0082; H02J 2310/14; G06Q 10/08
See application file for complete search history.

(56) References Cited

U.S. PATENT DOCUMENTS

| 6,993,417 | B2 * | 1/2006 | Osann, Jr. ............. G05B 15/02 700/291 |
| 7,657,763 | B2 | 2/2010 | Nelson et al. |
| 8,374,729 | B2 | 2/2013 | Chapel et al. |
| 9,013,283 | B1 | 4/2015 | Tackaberry |
| 9,651,973 | B2 | 5/2017 | Forbes, Jr. |
| 2002/0097546 | A1 * | 7/2002 | Weinberger .......... H01R 13/713 361/103 |
| 2008/0088293 | A1 * | 4/2008 | Beckman ................ H02J 9/005 323/299 |
| 2015/0309521 | A1 | 10/2015 | Pan |
| 2016/0116933 | A1 | 4/2016 | Craig et al. |

FOREIGN PATENT DOCUMENTS

WO   2011103262 A1   8/2011
WO   2016123463 A2   8/2016

* cited by examiner

*Primary Examiner* — Carlos R Ortiz Rodriguez
(74) *Attorney, Agent, or Firm* — Patterson + Sheridan, LLP

(57) ABSTRACT

Systems and methods to distribute power to individual power outlets are disclosed. A particular apparatus includes a memory having program code and a processor configured to access the memory and execute the program code to determine whether to allow power to be supplied to an individual power outlet. In one implementation, the determination is based on a current draw and a resistance reading associated with the power outlet.

16 Claims, 5 Drawing Sheets

SELECTIVE POWER DISTRIBUTION TO INDIVIDUAL OUTLETS

I. FIELD OF THE DISCLOSURE

The present disclosure relates generally to power supplies, and more particularly, to devices used to regulate power consumption.

II. BACKGROUND

Phantom loads, also known as vampire or standby power, refer to the energy drawn from an outlet by an appliance or gadget that is plugged in, but not in use. For example, a cellular phone charger consumes electricity even when it is not charging a phone. Many televisions and microwaves use more energy during the hours that they are not in use than they do when they are being used. In aggregate, these phantom loads add up to significant power loss and expense.

III. BRIEF SUMMARY

In a particular embodiment, an apparatus is disclosed that includes a memory storing program code a processor configured to access the memory and execute the program code to determine whether to allow power to be supplied to an individual power outlet. In one implementation, the determination is based on a current draw and a resistance reading associated with the power outlet.

In another embodiment, a method selectively distributes power to outlets by determining a current draw at a power outlet, determining a resistance at the power outlet, and selectively allowing or removing power from the power outlet based upon the determined current draw and determined resistance. In one example, power to the power outlet is allowed when the resistance has increased. In another example, power is removed from the power outlet when the resistance remains constant.

In another embodiment, a program product for accessing a register may include a computer readable storage medium having computer readable program code being executable by a processor to determine a current draw at a power outlet, determine a resistance at the power outlet, and selectively allow or remove power from the power outlet based upon the determined current draw and determined resistance.

Features that characterize embodiments are set forth in the claims annexed hereto and forming a further part hereof. However, for a better understanding of the embodiments, and of the advantages and objectives attained through its use, reference should be made to the Drawings and to the accompanying descriptive matter in which there are described exemplary embodiments.

IV. BRIEF DESCRIPTION OF THE DRAWINGS

V. DETAILED DESCRIPTION

An embodiment selectively and intelligently enables (e.g., turns on) or disables (e.g., turns off) individual outlets by detecting an amperage draw, as well as changes in resistance. The regulation may be implemented at an outlet or power strip level. The system may leverage a combination of resistance and current draw to determine if a device is plugged into an outlet, and switched on. By detecting the current state, the system may switch the outlet off, and by detecting resistance back on, eliminate phantom power usage from devices like laptop and cellular phone chargers.

An embodiment may monitor and turn individual power outlets (i.e., drains) on or off. This feature presents greater control than would an embodiment that turned off an entire power strip, for instance, based on a draw of a first outlet. Similarly, the regulation of individual outlets affords greater granularity than would a system that manages entire house usage at an aggregate circuit level. In this manner, embodiments provide the ability to selectively enable or disable individual outlets within a plurality of outlets in a receptacle or power strip based on an amount of resistance and current draw.

While an embodiment may use a master control device (and hub), other embodiments do not. For example, each outlet may have its own power regulating mechanism. In this manner, an embodiment may provide a whole house and circuit method to reduce phantom loads caused by idle electronics, cords left plugged in, and even the loss associated with keeping unused wires energized.

As such, embodiments of the system may reduce the amount of wasted energy and thereby increase the energy efficiency throughout an establishment. Energy expenses may be reduced for consumers. An implementation may improve energy certification.

Figure 1:
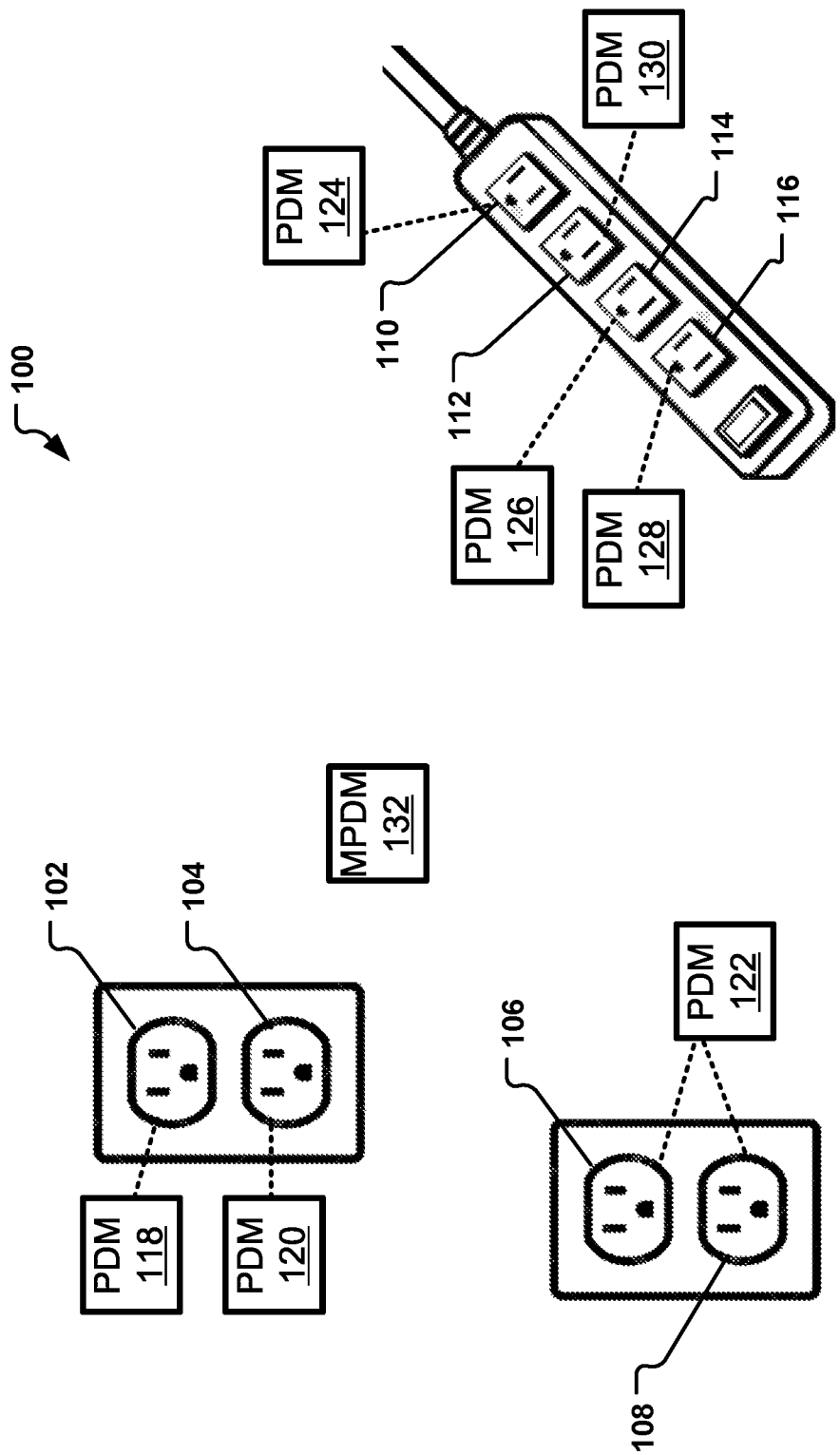
FIG. 1 shows a block diagram of a system comprising power outlets that are separately regulated by power distribution modules.

FIG. 1 is a block diagram depicting a system 100 comprising power outlets 102, 104, 106, 108, 110, 112, 114, 116 that are separately regulated by power distribution modules (PDM) 118, 120, 122, 124, 126, 128, 130. For instance, power distribution module 118 may communicate with and regulate power (e.g., turn off or on) to the power outlet 102. The power distribution module 122 may similarly monitor and regulate power to power outlets 106 and 108 based on current draw and resistance readings at each power outlet 106, 108. In such an instance, each power outlet 106, 108 is separately analyzed and controlled by the power distribution module 122. As shown in FIG. 1, dashed lines denote communications (e.g., monitoring and power regulation) between power distribution modules 118, 120, 122, 124, 126, 128, 130 and corresponding power outlets 102, 104, 106, 108, 110, 112, 114, 116. The power distribution modules 118, 120, 122, 124, 126, 128, 130 may be remote from or integral with the circuitry of their corresponding power outlets 102, 104, 106, 108, 110, 112, 114, 116. For instance, embodiments may incorporate Internet of things (IoT) technologies to communicate with one another. In one embodiment, a master distribution model 132 may coordinate actions of the individual power distribution modules 118, 120, 122, 124, 126, 128, 130. Another embodiment may not include a master distribution module.

Figure 2:
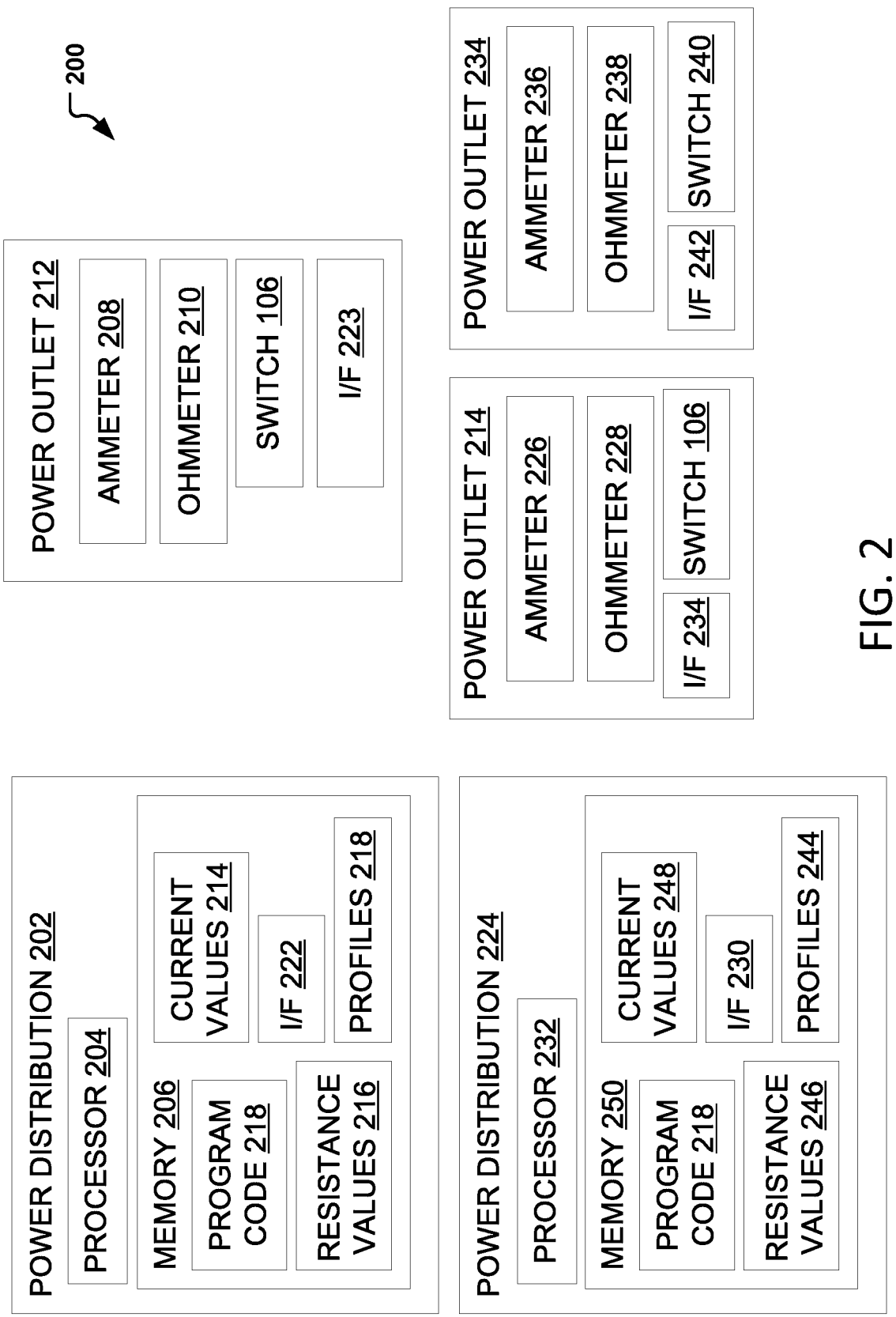
FIG. 2 is block diagram of a system that uses current and resistance readings at an outlet to determine whether to continue or initiate the delivery of power to the outlet from a supply.

FIG. 2 is a block diagram of an embodiment of an apparatus 200 that includes power distribution module 202 comprising a processor 204 and a memory 206. The processor 204 may be wirelessly or in direct electrical communication with an ammeter 208 and an ohmmeter 210. The ammeter 208 and the ohmmeter 210 may be connected to a power outlet 212. The processor 204 may use current and resistance readings 214, 216 when executing program code 218 to determine whether to continue or initiate the delivery of power to the outlet 212 from a supply (not shown). The processor may alternatively send a signal to a switch 220 to temporarily shut off power to the outlet 212.

The power distribution module 202 may include a wireless interface 222 to communicate with the ammeter 208 and an ohmmeter 210, and where desired, another networked device. The ammeter 208 and an ohmmeter 210 may be in communication with a local wireless interface 223 (I/F) configured to communicate with the wireless interface 223. As such, the power distribution module 202 may be remotely located from the power outlet 212. In another implementation, the power distribution module 202 may be integral with the power outlet 212, such as within a power strip or a housing having both the power outlet power distribution module circuitry.

The power outlet 212 may be one of multiple outlets wired in series or parallel to another power outlet 214. The power outlet 214 may be in communication with a power distribution module 224. An ammeter 226 and an ohmmeter 228 may measure current and resistance readings at the power outlet 214. Although other embodiments include hardwired connections, the power distribution model 224 may communicate with via a wireless interface 230 with an interface 232 that conveys the resistance and current readings 246, 248 from the ammeter 226 and an ohmmeter 228, as well as communicates with a switch 234. The wireless interface 230 and a processor 232 of the power distribution module 224 may regulate power at the power outlet 214.

In one implementation, the power distribution module 224 may additionally regulate power at another power outlet 234. As such, the power distribution module 224 may also receive and store resistance and current readings 236, 238 from an ammeter 226 and an ohmmeter 228 of the power outlet 234.

The memory 206 may include profiles associated with one or more electronic devices. The profiles may include expected current draw and resistance readings associated with different electronic devices. For instance, a coffee machine may have a known current draw and resistance when plugged in, but idle. The current draw and resistance of the coffee machine when operating may also be known and stored in a profile. The electrical characteristics (e.g., resistance and current draw) may be learned by power distribution module 202 the over time. For instance, the characteristics may be recorded and stored as averages using cognitive processes. In another example, the characteristics may be input from a repository source (e.g., downloaded) regarding multiple known appliances in the marketplace.

While ammeters and an ohmmeters are shown in the embodiment of FIG. 2, it will be appreciated other sensors could be used. For instance, a voltmeter could be used to determine either the current or the resistance, when the other quantity is known.

Figure 3:
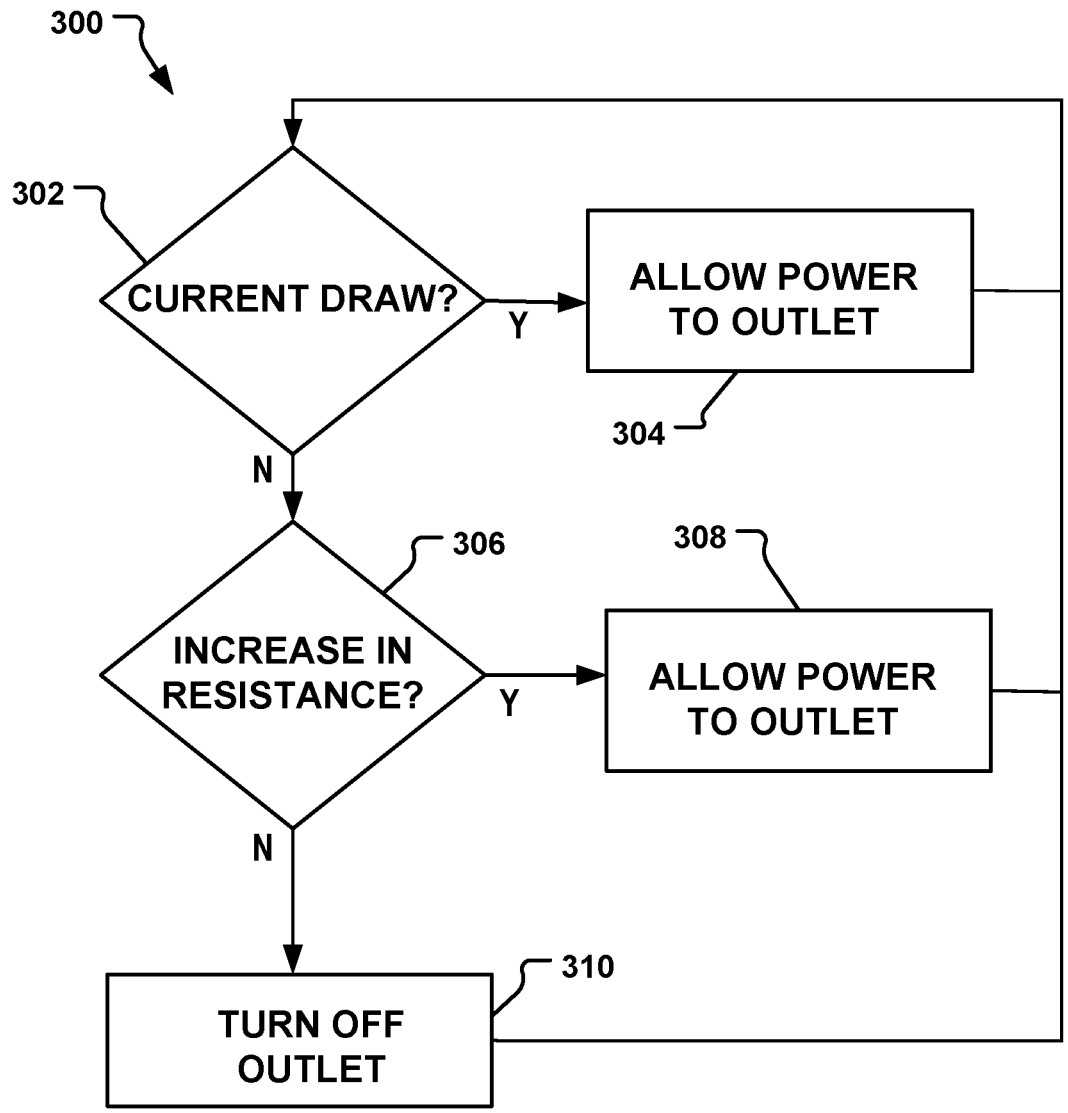
FIG. 3 is a flowchart of an embodiment of a method of selectively distributing power to individual power outlets.

FIG. 3 is a flowchart of an embodiment of a method 300 of selectively distributing power to individual power outlets. At 302, the system may determine if a current draw is present at an outlet. Where a current draw is detected at 302, the system may turn on or allow the power to be received at the outlet at 304. Where there is alternatively no current draw at 302, the system may determine at 306 is a detected resistance has increased. The outlet will receive power at 308 when the resistance has increase at 306. Alternatively, when the resistance has not increased at 306 (and there is not current draw at 302), the power to the outlet may be turned off at 310. According to an embodiment, if the system has turned power off for an outlet, there cannot be current draw, and therefore the system may rely on resistance change to turn the outlet on.

Figure 4:
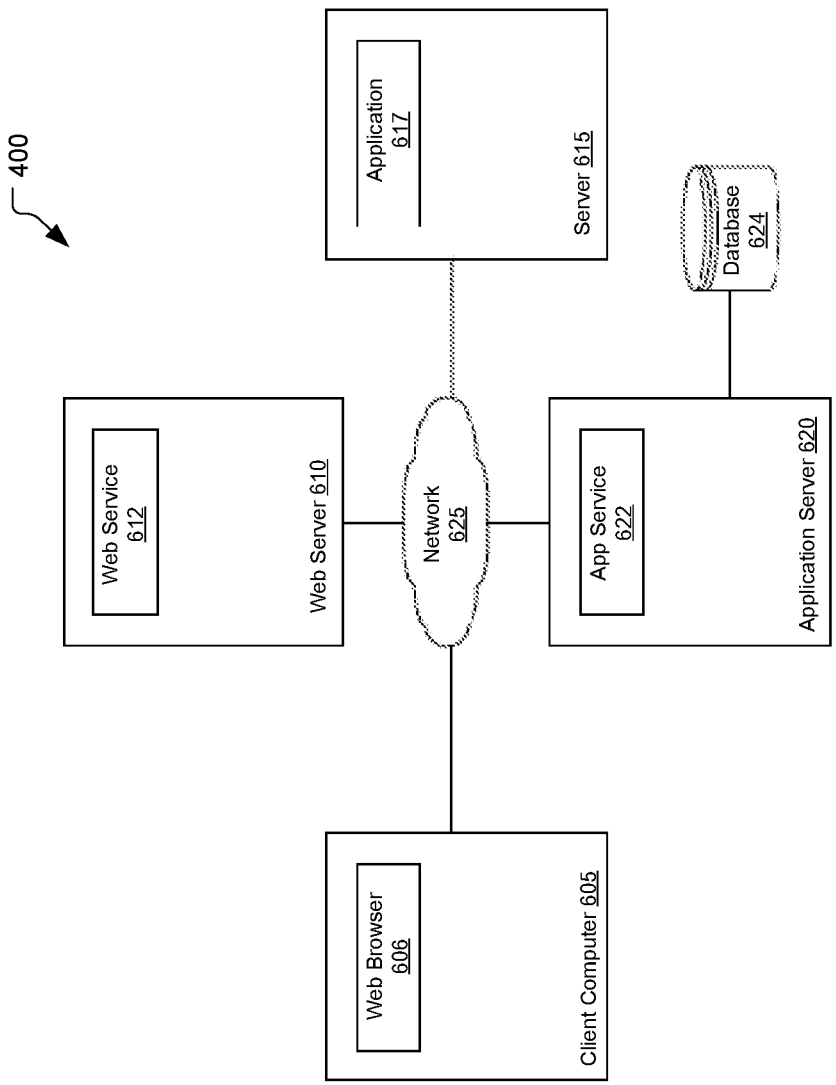
FIG. 4 illustrates another example computing system according to one embodiment, such as may be realized using a networked environment.

FIG. 4 illustrates another example computing system according to one embodiment, such as may be realized using a networked environment. As shown, the computing environment 400 includes a client computer 405, a web server 410, a server 415, and an application server 420. The client computer 105 may be a physical system (e.g., a desktop, laptop computer, mobile device, etc.) or a virtual computing instance executing in the cloud. The client computer 405 includes a web browser 407. A user may access data services through the web browser 407 over a network 425 (e.g., the Internet).

For instance, a user may access a web service 412 executing on a web server 410. In one embodiment, the web service 412 provides a web interface for an application server 420 (e.g., executing an application service 422). More specifically, the application service 422 provides a database 424. The database 424 includes data presented to users on the web browser 407.

Figure 5:
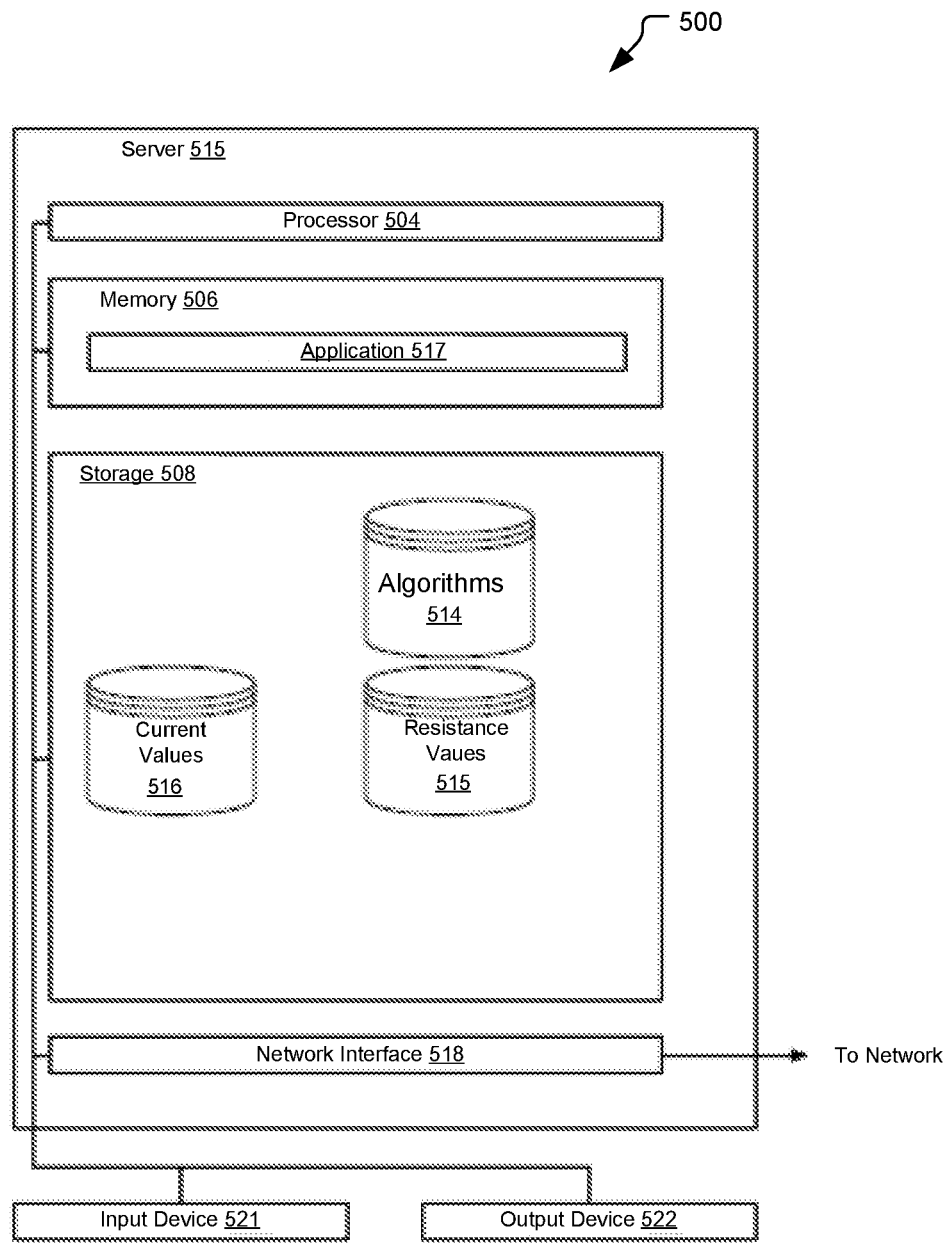
FIG. 5 further illustrates a server, such as the server of FIG. 4, according to one embodiment.

FIG. 5 further illustrates a server 515, such as the server 415 of FIG. 4, according to one embodiment. The server 515 generally includes a processor 504 connected via a bus to a memory 506, a network interface device 518, a storage 508, an input device 521, and an output device 524. The server 515 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 504 is included to be representative of a single CPU, multiple CPUs, a single CPU having multiple processing cores, and the like. Similarly, the memory 506 may be a random access memory. While the memory 506 is shown as a single identity, it should be understood that the memory 506 may comprise a plurality of modules, and that the memory 506 may exist at multiple levels, from high speed registers and caches to lower speed but larger DRAM chips. The network interface device 518 may be any type of network communications device allowing the navigation server 510 to communicate with other computers via the network 525.

The storage 508 may be a persistent storage device. Although the storage 508 is shown as a single unit, the storage 508 may be a combination of fixed and/or removable storage devices, such as fixed disc drives, solid state drives, removable memory cards, optical storage and network storage systems.

As shown, the memory 506 contains the application 517, which may be an application generally executed to take actions described herein. Storage 508 contains the algorithms 514, resistance values 515, and current measurements 516.

The input device 521 may provide a keyboard and/or a mouse, etc. The output device 524 may be any conventional display screen. Although shown separately from the input device 521, the output device 524 and input device 521 may be combined. For example, a display screen with an integrated touch-screen may be used.

The system may introduce variations with alternatives for various words and concepts. Concept lists may be populated by the system to increase accuracy. The system may allow for the automatic expansion of the semantic space during graph creation. Elements may be automatically matched based on their semantic meaning during the graph query. The system may further adapt a word representation to the domain if needed by retraining the word representations. The system may use vocabulary automatically harvested from domain specific documents for clustering. The system may use the labels of these clusters as a way to automatically discover entity types for variation generation in the dialog system. The system may accomplish automatic creation and query matching, including the expansion and matching of triplets.

The system may automatically select cluster radii to focus results. An embodiment of the system may add a kernel that dissipates polynomially (e.g., one that is scaled with a small coefficient). The kernel may resolve instabilities in convergence of the algorithm. Regarding scaling of the kernel, the system may automatically increase or decrease the scaling factor based on how close to the highest possible mutual information that data is when the algorithm converges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The invention claimed is:

1. An apparatus comprising:
a memory storing program code; and
a processor configured to access the memory and execute the program code to:
determine to allow power to be supplied to a first power outlet based on a first determination that there is no current draw present at the first power outlet and a second determination that there is an increase in resistance at the first power outlet; and
while allowing power to be supplied to the first power outlet, determine to turn off power to a second power outlet based on a third determination that there is no current draw present at the second power outlet and a fourth determination that a resistance at the second power outlet has remained constant.

2. The apparatus of claim 1, wherein the power is supplied to the second power outlet when a current draw is detected at the second power outlet.

3. The apparatus of claim 1, wherein the power is supplied to the second power outlet when a resistance at the second power outlet increases.

4. The apparatus of claim 1, wherein the processor is configured to determine the resistance at the second outlet from an ohmmeter at the second power outlet.

5. The apparatus of claim 1, wherein the processor is configured to determine the current draw at the second power outlet from an ammeter at the second power outlet.

6. The apparatus of claim 1, wherein the processor is housed proximate to the second power outlet.

7. The apparatus of claim 1, wherein the processor is remote from the second power outlet.

8. The apparatus of claim 1, wherein the processor communicates wirelessly with a sensor of the second power outlet.

9. The apparatus of claim 1, wherein the memory includes a profile associated with an electrical characteristic of a device plugged into the second power outlet.

10. The apparatus of claim 1, wherein the processor is configured to generate a profile associated with an electrical characteristic of a device plugged into the second power outlet.

11. A method of selectively distributing power to outlets, the method comprising:

determining a current draw at first and second power outlets;

determining a resistance at the first and second power outlets; and while allowing power to be supplied to the first power outlet, determining to turn off power to the second power outlet based on a determination that there is no current draw at the second power outlet and a determination that the resistance at the second power outlet has remained constant.

12. The method of claim 11, further comprising allowing power to the second power outlet when the resistance at the second power outlet has increased.

13. The method of claim 11, wherein the resistance at the second power outlet is determined from an ohmmeter at the second power outlet.

14. The method of claim 11, wherein the current draw at the second power outlet is determined from an ammeter at the second power outlet.

15. The method of claim 11, the first and second power outlets are part of a power strip having power supplies that are separately regulated.

16. A non-transitory computer readable storage medium, to generate a cognitive model, comprising: a computer readable program code embodied therewith, the computer readable program code being executable by a processor to determine a current draw at first and second power outlets a power outlet, determine a resistance at the first and second power outlets, and while allowing power to be supplied to the first power outlet, determine to turn off power to the second power outlet based on a determination that there is no current draw at the second power outlet and a determination that the resistance at the second power outlet has remained constant.

* * * * *